(12) United States Patent  (10) Patent No.: US 9,302,627 B1
Shahmehri et al.  (45) Date of Patent: Apr. 5, 2016

(54) TWO-SIDED FLEXIBLE TONNEAU COVER HAVING A PLANAR FORWARD EXTENDING COVER MEMBER

(71) Applicant: Ford Global Technologies, LLC, Dearborn, MI (US)

(72) Inventors: Babak Shahmehri, Canton, MI (US); Paul Rakoczy, Madison Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 161 days.

(21) Appl. No.: 14/546,365

(22) Filed: Nov. 18, 2014

(51) Int. Cl.
*B60R 5/04* (2006.01)

(52) U.S. Cl.
CPC ..................... *B60R 5/047* (2013.01)

(58) Field of Classification Search
CPC .......... B60R 5/045; B60R 5/047; B60R 5/048
USPC ................ 296/24.43, 24.44, 98, 37.16, 24.4; 160/DIG. 2
See application file for complete search history.

(56) References Cited

U.S. PATENT DOCUMENTS

| | | | |
|---|---|---|---|
| 4,480,675 A | 11/1984 | Berkemeier | |
| 5,011,208 A | 4/1991 | Lewallen | |
| 5,584,523 A | 12/1996 | Kawaguchi | |
| 6,213,186 B1 * | 4/2001 | Torres | B60J 1/2038 160/24 |
| 6,702,355 B1 * | 3/2004 | Price | B60R 5/045 296/37.16 |
| 7,673,921 B2 | 3/2010 | Hirayama et al. | |
| 7,815,235 B2 | 10/2010 | Hayashi et al. | |
| 8,465,079 B2 | 6/2013 | Saito et al. | |
| 8,523,268 B2 | 9/2013 | Kikuchi et al. | |
| 9,016,758 B1 * | 4/2015 | Lee | B60R 5/047 296/100.11 |
| 2005/0023854 A1 * | 2/2005 | Woerner | B60R 5/047 296/24.43 |
| 2005/0269047 A1 * | 12/2005 | Schleef | B60R 5/047 160/401 |

FOREIGN PATENT DOCUMENTS

| | | |
|---|---|---|
| DE | 102010039763 | 3/2012 |
| EP | 0524397 | 1/1993 |
| EP | 1787864 | 3/2009 |

* cited by examiner

*Primary Examiner* — Jason S Morrow
(74) *Attorney, Agent, or Firm* — Vichit Chea; Price Heneveld LLP (57) ABSTRACT

A tonneau cover for a vehicle includes an outwardly biased first cover, wherein the first cover is biased from an interior of the housing to engage a seatback, an inwardly biased second cover selectively extendable from the interior of the housing opposite the first cover and a tab of the first cover that selectively engages the seatback as the seatback is moved between a plurality of lateral positions.

20 Claims, 14 Drawing Sheets

TWO-SIDED FLEXIBLE TONNEAU COVER HAVING A PLANAR FORWARD EXTENDING COVER MEMBER

FIELD OF THE INVENTION

The present invention generally relates to tonneau covers for rear cargo areas of vehicles, and more specifically, tonneau covers for the rear cargo area of vehicles having rear adjustable seats.

BACKGROUND OF THE INVENTION

Various automobiles, typically, SUVs and CUVs, include an open rear cargo area that can be covered using a tonneau cover that engages positions of the interior of the vehicle. A tonneau cover typically covers a portion of the rear cargo area when not in use. Tonneau covers can also be used to substantially secure various lightweight items within the rear cargo area under the tonneau covers such that these lighter weight items are kept within the rear cargo area. Typically, the tonneau cover is an aesthetic member meant to conceal portions of the rear cargo area. Conventional tonneau covers are unable to accommodate the adjustability and plurality of configurations covered by current automobiles and typically do not extend functionality to a vehicle with these varying seating configurations.

SUMMARY OF THE INVENTION

According to one aspect of the present invention, a tonneau cover for a vehicle includes an outwardly biased first cover, wherein the first cover is biased from an interior of the housing to engage a seatback. The tonneau cover also includes an inwardly biased second cover selectively extendable from the interior of the housing opposite the first cover. A tab of the first cover selectively engages the seatback as the seatback is moved between a plurality of lateral positions.

According to another aspect of the present invention, a tonneau cover for a vehicle includes a cover housing having an outwardly-biased front cover selectively extending from an interior of the cover housing. The outwardly-biased front cover is biased away from the housing and toward a seatback. A biasing rib is disposed within an interior of the front cover, wherein the interior of the front cover is defined by a plurality of substantially rigid panels.

According to another aspect of the present invention, a tonneau cover for a vehicle includes a front cover selectively operable between retracted and extended positions relative to a housing. A seat having a seatback receives the front cover in the extended position. A biasing rib of the front cover biases the front cover toward the extended position. A rear cover is selectively extendable from the housing.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
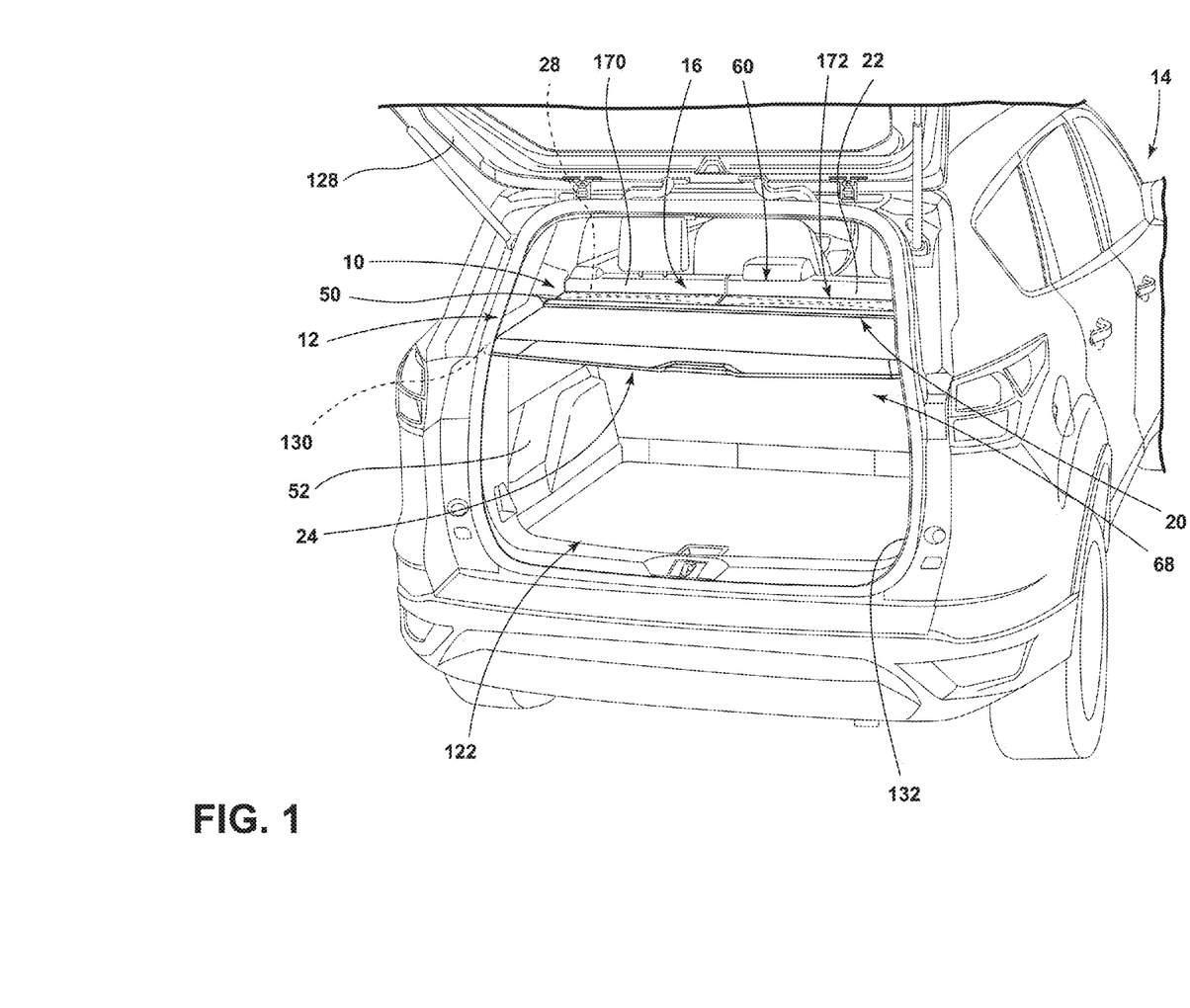
FIG. 1 is a rear top perspective view of a vehicle with one embodiment of the tonneau cover installed within and extended across the rear cargo area.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

With reference to FIGS. 1-4, reference numeral 10 generally refers to an adjustable tonneau cover shown and installed within a rear cargo area 12 of a vehicle 14, according to one embodiment. The adjustable tonneau cover 10 includes an outwardly biased first cover 16 wherein the first cover 16 is biased from an interior 18 of a housing 20 to engage a seatback 22. An inwardly biased second cover 24 is selectively extendable from the interior 18 of the housing 20 and is disposed opposite the first cover 16. A bumper 26 of the first cover 16 is configured to selectively engage the seatback 22 as the seatback 22 is moved between a plurality of lateral positions. According to the various embodiments, the first cover 16 includes at least one biasing rib 28 that moves between a loaded position 30, wherein the first cover 16 is disposed within the interior 18 of the housing 20 in a retracted position 32, and a release position 34, wherein the first cover 16 is moved outward from the housing 20 toward the seatback 22 to define an extended position 36. It is also contemplated that the first cover 16 can be a planar member that extends or retracts in a substantially linear motion relative to the housing 20 of the tonneau cover 10.

As generally illustrated in the embodiments depicted in FIGS. 1-4, the tonneau cover 10 is selectively installed within the rear cargo area 12 of the vehicle 14, such that the housing 20 of the tonneau cover 10 is installed within a housing receptacle 50 defined by interior side panels 52 of the vehicle 14 within the rear cargo area 12. It is contemplated that the housing receptacle 50 can be molded into the interior side panel of the vehicle 14, or can be a separate fixture attached to the interior side panels 52. In various embodiments, the housing receptacle 50 can include one or more retention features that are configured to substantially secure the housing 20 of the tonneau cover 10 within the housing receptacle 50. Such retention features can include, but are not limited to, tabs, hooks, interference mechanisms, locks, as well as other similar housing retention features.

Referring now to FIGS. 2-6, the seat 60 of the vehicle 14, which can be a front seat or a rear seat, is configured to move laterally between a forward position 62 and a rearward position 64 relative to the housing receptacle 50 that holds the housing 20 of the adjustable tonneau cover 10. In such an embodiment, the front first cover 16 is configured to extend and retract with the lateral movement of the seat 60 when the bumper 26 of the first cover 16 is engaged with a cooperating bumper receptacle 66 disposed within the seatback 22 of the seat 60. In this manner, when the bumper 26 of the first cover 16 is engaged with the bumper receptacle 66, and the seat 60 is moved to a forward position 62, the first cover 16 extends from the housing 20 and into a front portion 68 of the rear cargo area 12 between the housing 20 and the seat 60 such that the first cover 16 conceals the front portion 68 of the rear cargo area 12. Accordingly, the bumper 26 of the first cover 16 and the bumper receptacle 66 are configured to remain engaged as the seat 60 is moved laterally, and when the seatback 22 of the seat 60 is moved rotationally between a plurality of reclined and upright positions.

Referring now to FIGS. 2-9, the outwardly biased first cover 16 of the tonneau cover 10 defines an inner portion 80 that is defined by a plurality of planar sidewalls 82. The biasing ribs 28 can be disposed within the interior portion of the outwardly biased first cover 16. Each of the biasing ribs 28 is attached to a receiving portion 84 defined within the housing 20 at a first end 86 of each of the biasing ribs 28. A second end 88 of each of the biasing ribs 28 is attached to a portion of the first cover 16. In this manner, as each of the biasing ribs 28 is moved toward the loaded position 30, the first cover 16 moves in the direction of the receiving portion 84 of the housing 20. Similarly, when each of the biasing ribs 28 is moved toward the release position 34, the first cover 16 moves outward from the housing 20, away from the receiving portion 84, and toward the seatback 22.

As illustrated in the various embodiments of FIGS. 1-9, one or more biasing ribs 28 are disposed within the inner portion 80 of the first cover 16. The biasing ribs 28 extend from a front section 100 of the first cover 16 to the receiving portion 84 of the housing 20. Each of the biasing ribs 28 is biased such that the ribs tend toward a linear elongated configuration. As such, when the first cover 16 is disposed in the retracted position 32, each of the biasing ribs 28 is at least partially coiled, folded, or otherwise deflected to define the loaded position 30. When in the loaded position 30, each of the biasing ribs 28 tends to move toward the elongated configuration defining the release position 34. In turn, the biasing ribs 28 bias the first cover 16 outward from the housing 20 toward the extended position 36 and the seatback 22.

Figure 7:
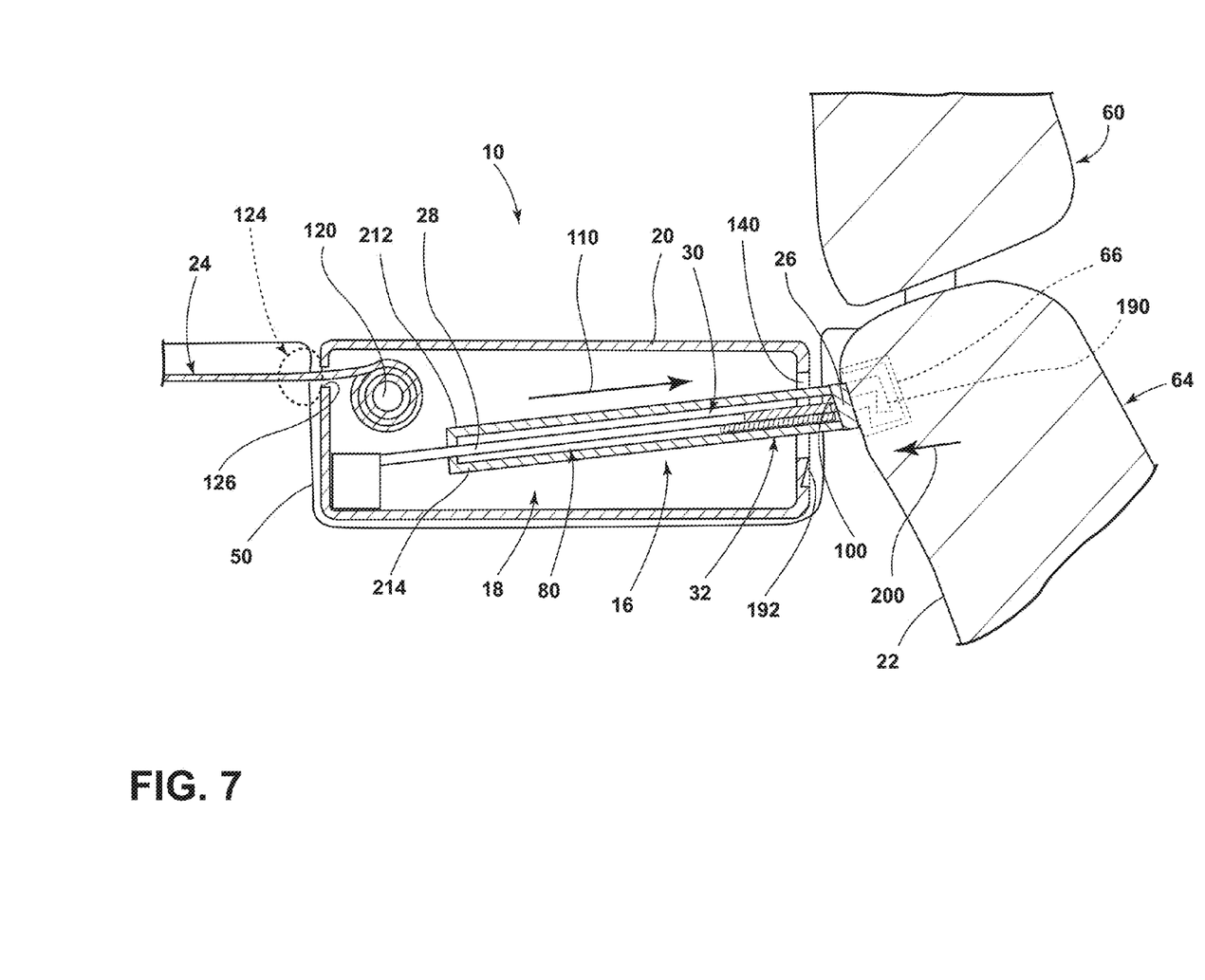
FIG. 7 is an enlarged sectional view of FIG. 5 taken at area VII.
Figure 8:
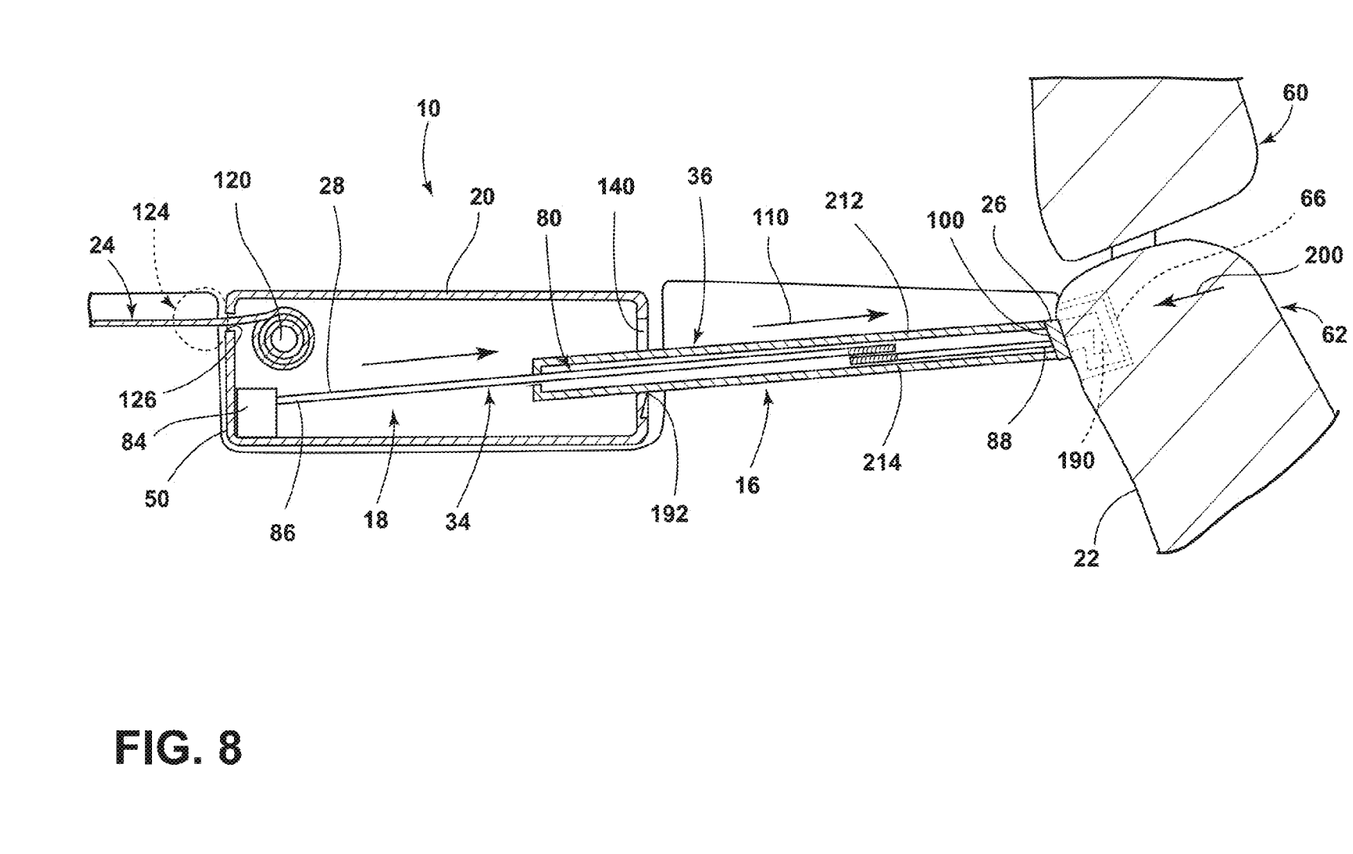
FIG. 8 is an enlarged cross-sectional view of FIG. 6 taken at area VIII.
Figure 9:
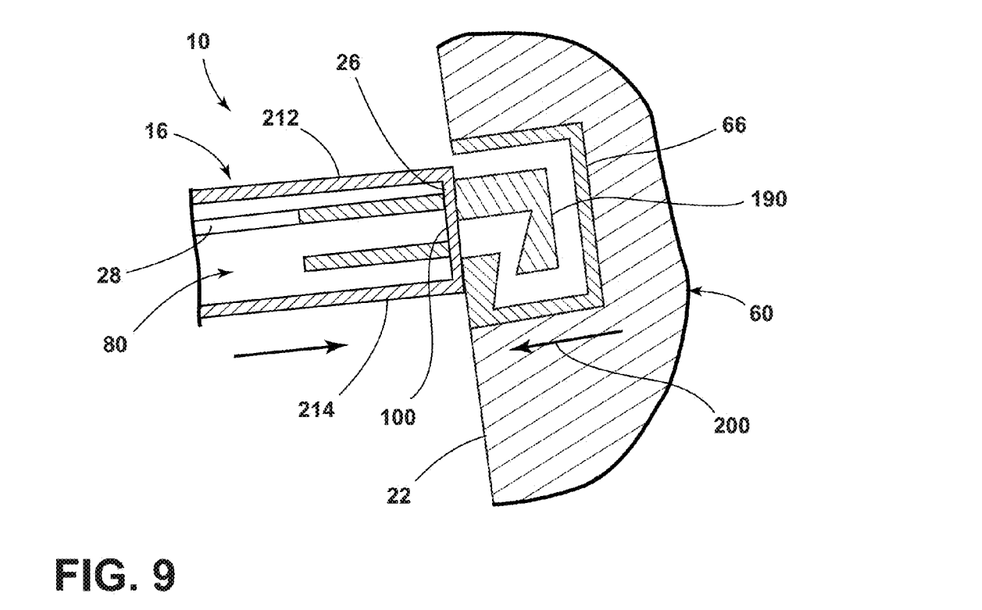
FIG. 9 is a cross-sectional view of the tonneau cover of FIG. 3 taken along line IX-IX showing the engagement of an embodiment of a bumper and a bumper receptacle.
Figure 9A:
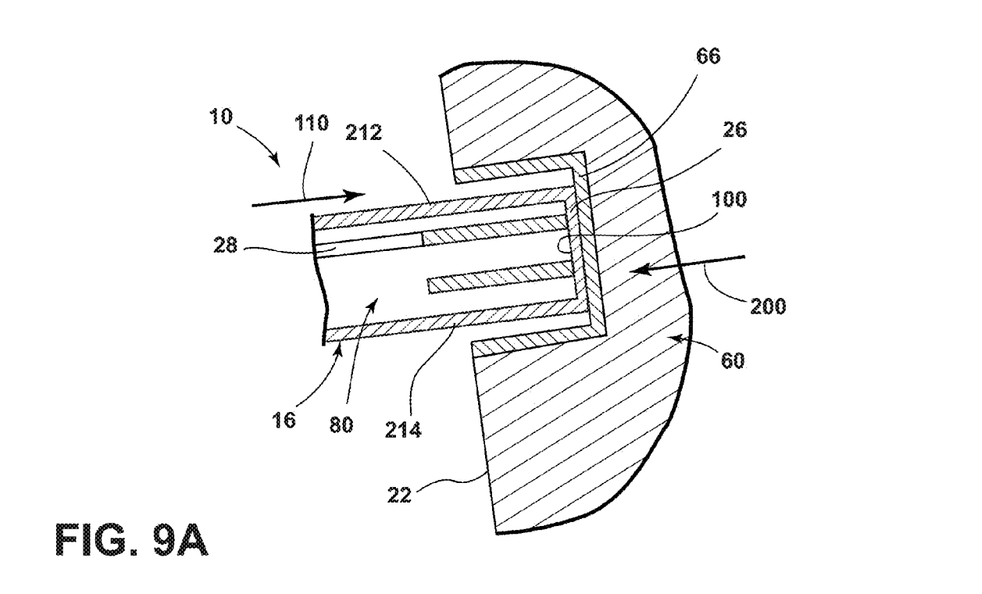
FIG. 9A is a cross-sectional view of the tonneau cover of FIG. 9 showing the engagement of an alternate embodiment of a bumper and a bumper receptacle.

Referring now to the embodiment depicted in FIGS. 7-9, due to the biasing force created by the tendency of each of the biasing ribs 28 to move toward the elongated release position 34, the biasing ribs 28 tend to move the planar first cover 16 toward the extended position 36 and into engagement with the seatback 22. Accordingly, as the seatback 22 moves between forward and rearward positions 62, 64 and the various upward and reclined positions, each of the biasing ribs 28 tends to place an outward biasing force 110 upon the planar first cover 16 to outwardly extend the planar first cover 16 into an abutting engagement with the seatback 22.

Referring again to the embodiment illustrated in FIGS. 5-8, the tonneau cover 10 can include a rear spool 120 that is coupled to the rear second cover 24 that extends rearwardly from the housing 20 to at least partially cover the back portion 122 of the rear cargo area 12. According to the various embodiments, the rear spool 120 is rotationally biased such that the second cover 24 tends to move toward a coiled position 124 within the housing 20 and around the spool. The second cover 24 can be pulled from the housing 20 through a rear aperture 126 defined within the housing 20 and moved toward the rear door 128 of the vehicle 14. As the second cover 24 is moved towards the rear door 128, the second cover 24 is continually biased toward the coiled position 124 such that when the user no longer requires the use of the second cover 24, the user can simply detach the second cover 24 from a rear cover receptacle 130 near the rear wall 132 or rear door 128 of the vehicle 14 and allow the rotational biasing force of the rear spool 120 to retract the second cover 24 into the coiled position 124 around the spool within the housing 20.

According to various embodiments, the front first cover 16 can be a substantially planar member that is retracted and extended through a front aperture 140 defined within the housing 20. The front first cover 16, when in the retracted position 32 such that the biasing ribs 28 are in the loaded position 30, is configured to extend at least partially below the rear spool 120 disposed within the housing 20. In such an embodiment, the first cover 16 is a substantially rigid and planar member that extends and retracts through the front aperture 140 of the housing 20. The planar sidewalls 82 that make up the outer surface of the first cover 16 remain in a planar configuration, such that the first cover 16 does not substantially bend or deflect as it moves between the retracted and extended positions 32, 36.

Figure 10:
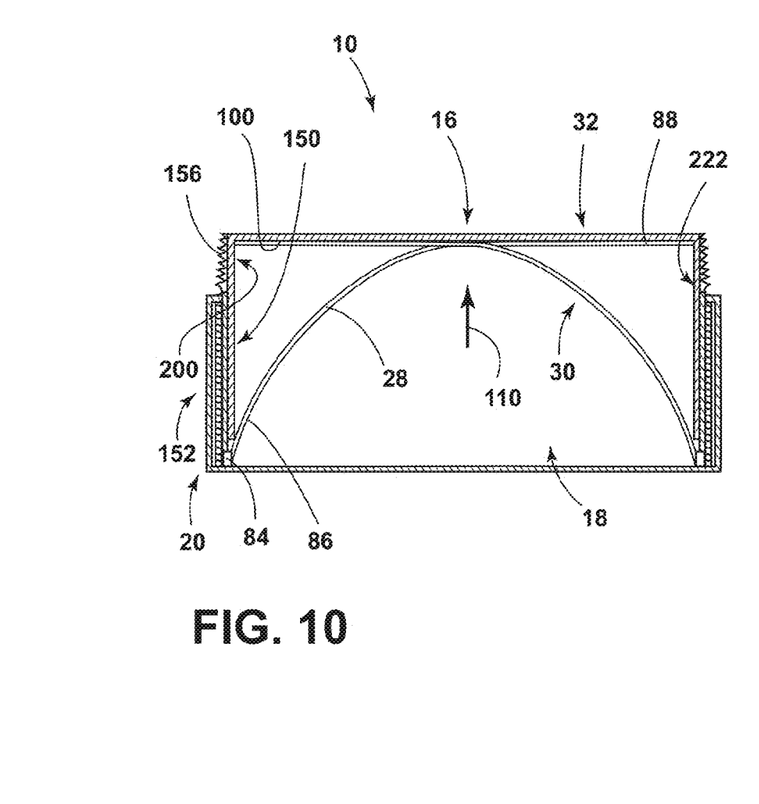
FIG. 10 is a schematic lateral section view of an alternate embodiment of the tonneau cover housing and a planar front cover with the planar front cover in a retracted position.
Figure 11:
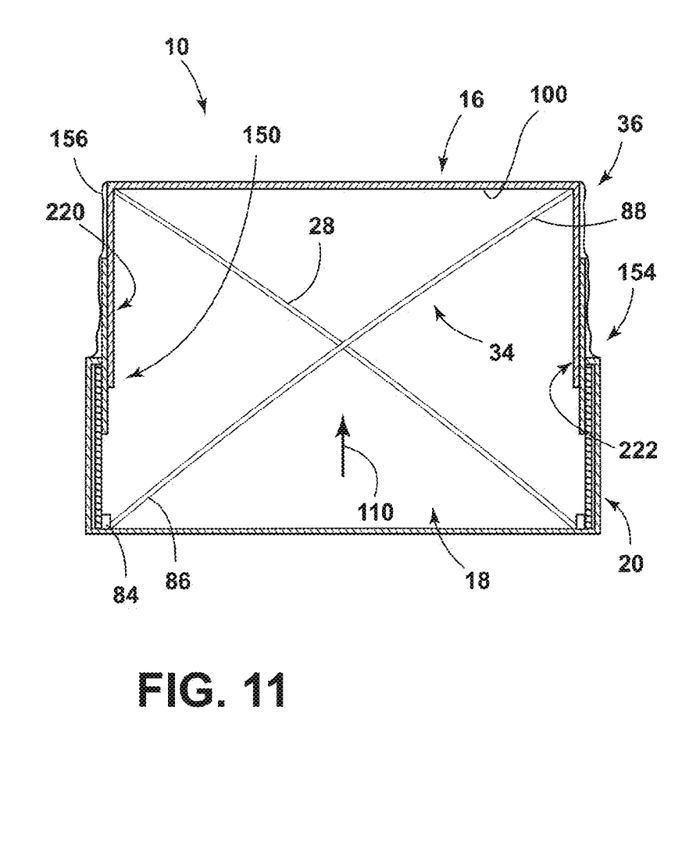
FIG. 11 is a lateral cross-sectional view of the tonneau cover housing of FIG. 10, with the planar front cover outwardly biased to an extended position.

According to various alternate embodiments, as illustrated in FIGS. 10 and 11, the first cover 16 can include an expandable interior structure 150 having various internal members that slide, glide, rotate, or otherwise move in relation to one another. In such an embodiment, the expandable interior structure 150 forms a more compact configuration 152 when the first cover 16 is in the retracted position 32 and expands to an enlarged configuration 154 when the first cover 16 is moved to the extended position 36. In order to bias the first cover 16 toward the extended position 36, the expandable interior structure 150 includes at least one biasing rib 28 that extends from a portion of the expandable interior structure 150 to a portion of the housing 20. The biasing rib 28 tends to be biased towards the elongated release position 34 and, in turn, biases the first cover 16 toward the seatback 22. In order to provide for the movement of the expandable interior structure 150, the first cover 16 can include a flexible outer covering 156 that extends and contracts with the lateral movement of the first cover 16 between the retracted and extended positions 32, 36. In this embodiment, the flexible outer covering 156 can be connected to the housing 20 proximate the front aperture 140 such that as the expandable interior structure 150 moves toward the enlarged configuration 154, the flexible outer covering 156 can operate to move with the expandable interior structure 150. Similarly, when the expandable interior structure 150 is moved toward the compact configuration 152, slack is formed in the flexible outer covering 156 such that the flexible outer covering 156 moves in an "accordion" type movement to conceal the expandable interior structure 150 and also move between the retracted and extended positions 32, 36 of the front cover.

Figure 2:
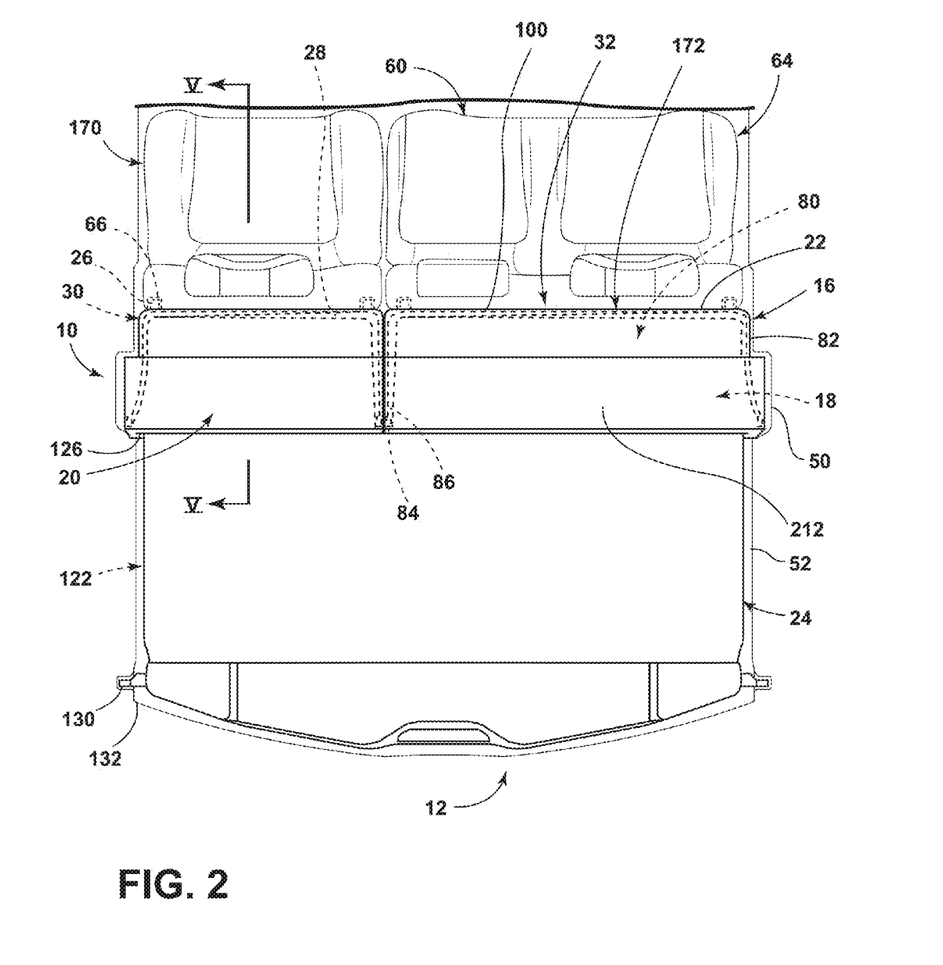
FIG. 2 is a top plan view of the embodiment of FIG. 1 with the seat in a rearward position.
Figure 3:
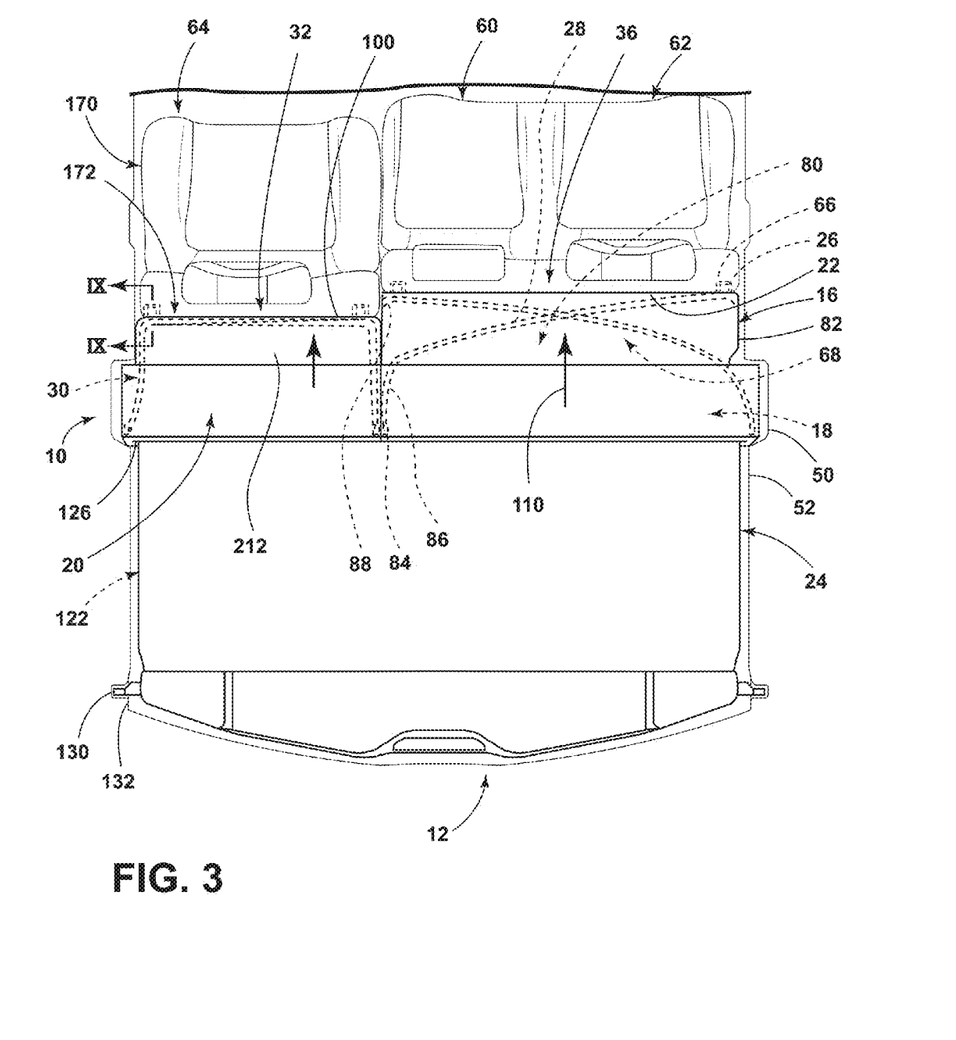
FIG. 3 is a top plan view of the embodiment of FIG. 2 with a section of the seat in a partially forward position.
Figure 4:
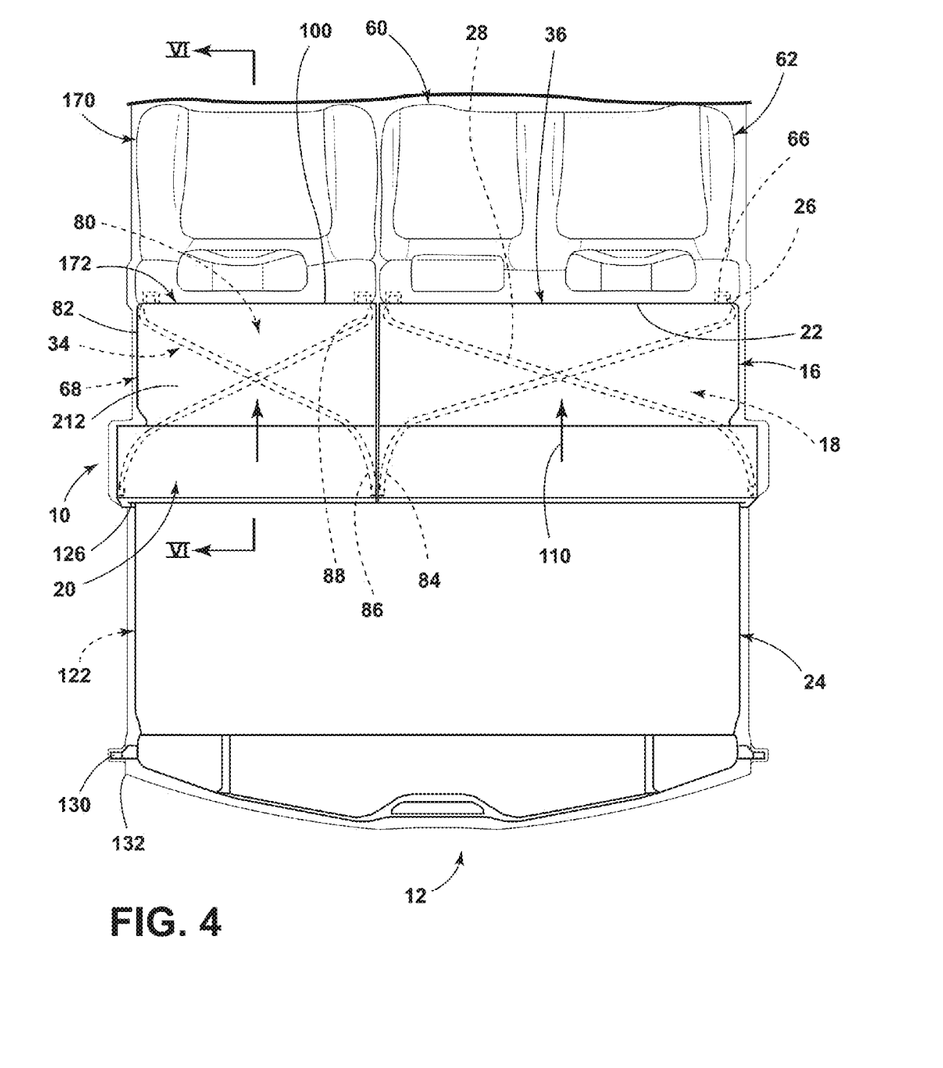
FIG. 4 is a top plan view of the embodiment of FIG. 3 with the seat in a forward position.
Figure 5:
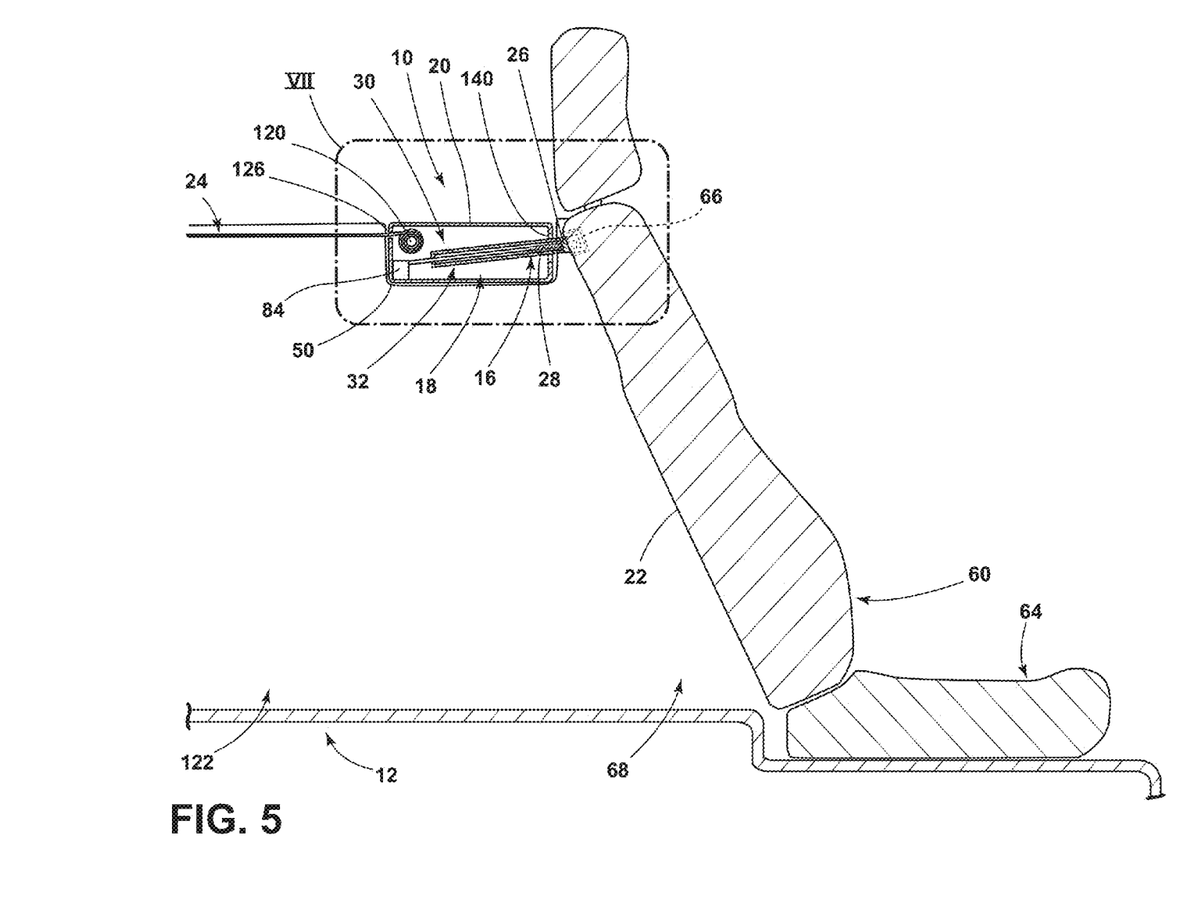
FIG. 5 is a cross-sectional view of the embodiment of FIG. 2 with the seat in the rearward position, taken along line V-V.
Figure 6:
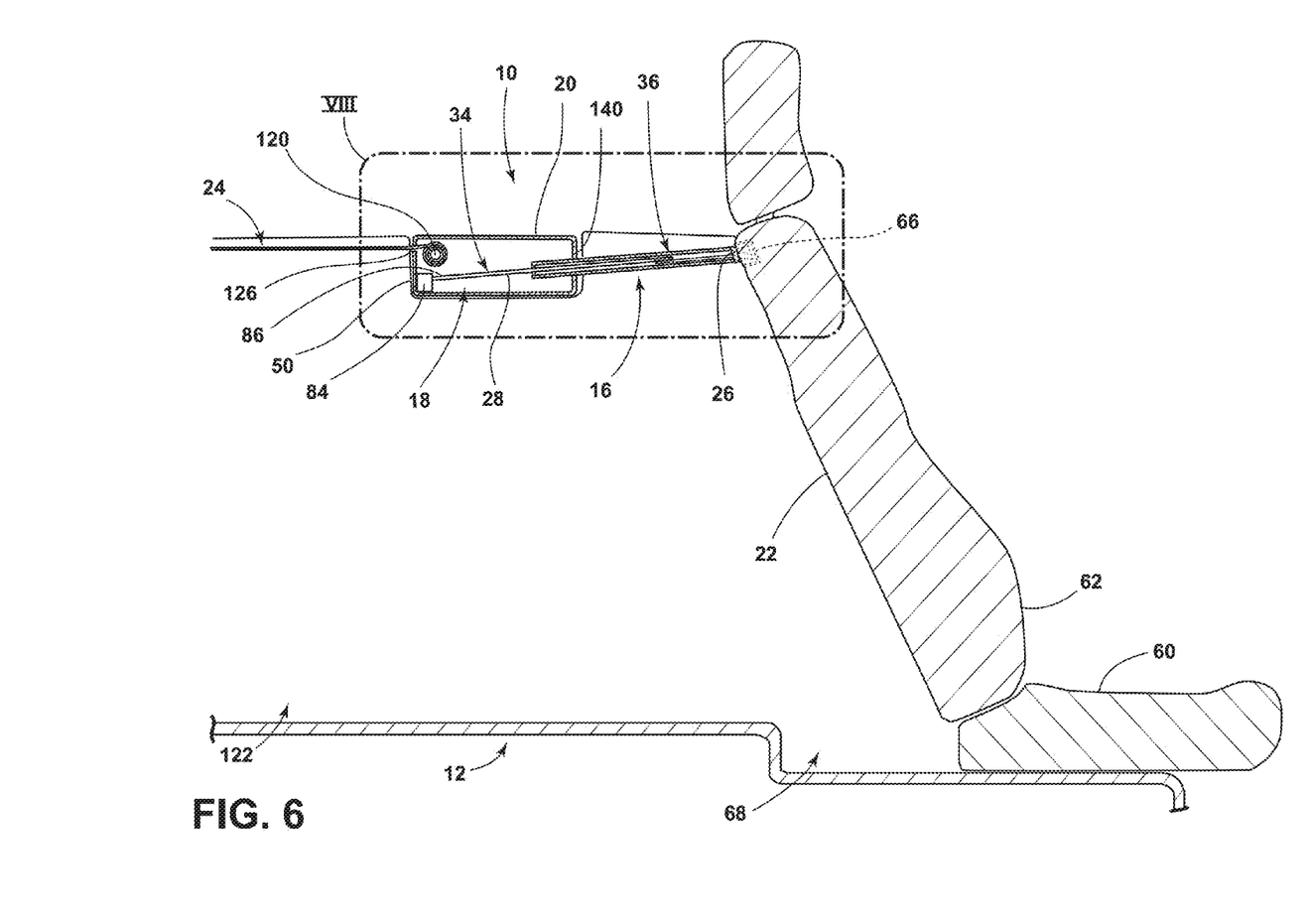
FIG. 6 is a cross-sectional view of the embodiment of FIG. 4, with the seat in the forward position, taken along line VI-VI.

Referring again to the embodiment depicted in FIGS. 2-4, the seatback 22 of the seat 60 disposed within the passenger compartment of the vehicle 14 can extend across two or more individually operable seats 170. In such an embodiment, the first cover 16 can include a plurality of cover subsections 172, wherein each cover subsection corresponds to one of the respective two or more individually operable seats 170. Accordingly, the seat 60 of a vehicle 14 may be split into separate "captain-type" seats in a 60/40 configuration, a 50/50 configuration, a 40/20/40 configuration, or some other similar configuration. Each of the left and right and middle individually operable seats 170 are individually operable between separate forward and rearward positions 62, 64. Accordingly, the first cover 16 of the tonneau cover 10 can be cooperatively split into two or more cover subsections 172 that are sized to match the proportions of the individually operable seats 170 of the seat 60 of the vehicle 14. It is contemplated that each of the cover subsections 172 can include dedicated biasing ribs 28 that extend each of the cover subsections 172, independently of one another, between respective retracted and extended positions 32, 36. Each of the biasing ribs 28 tends each cover subsection of the first cover 16 toward the extended position 36 and into an abutting engagement with the corresponding seatback 22 of the individually operable seats 170.

Referring again to the embodiment illustrated in FIGS. 5-8, the first cover 16 can be configured as a rigid panel made up of by a plurality of sidewalls 82 that define the inner portion 80, wherein each of the biasing ribs 28 is at least partially disposed within the inner portion 80. The first cover 16 can include a rib aperture 180 disposed proximate a base 182 of the first cover 16 through which each of the biasing ribs 28 can extend to be engaged with the receiving portion 84 of the housing 20. As the first cover 16 moves toward the extended position 36, the first end 86 of each of the biasing ribs 28 maintains its attachment with the receiving portion 84 of the housing 20 and the second end 88 of each biasing rib 28 maintains a similar attachment with at least a portion of the first cover 16. The biasing rib 28 can be attached to various portions of the first cover 16, where such attachment portions can include, but are not limited to, the base 182 of the first cover 16, the front section 100 of the first cover 16, the portion of the sidewalls 82 of the first cover 16, or other similar portion of the first cover 16 such that the movement of the biasing rib 28 from the loaded position 30 to the release position 34 operates the first cover 16 to be biased from the retracted position 32 toward the extended position 36.

Referring again to the embodiment illustrated in FIGS. 7, 8, 12 and 13, as the first cover 16 is biased toward the extended position 36, each of the biasing ribs 28 extends toward the release position 34 and the rib aperture 180 defined within the sidewall of the first cover 16 allows portions of the biasing rib 28 to slide through the rib aperture 180 as the first cover 16 moves toward the extended position 36.

Referring again to the embodiment illustrated in FIGS. 7-9A, the bumper 26 of the first cover 16 that is adapted to engage the seatback 22 includes a retaining feature 190 that is adapted to engage a bumper receptacle 66 defined within the seatback 22. The bumper receptacle 66 is configured to selectively retain the at least one retaining feature 190 of the bumper 26 as the seat 60 moves laterally between the forward and rearward positions 62, 64 and also as the seatback 22 moves rotationally between the reclined and upright positions. The retaining feature 190 of the bumper 26 of the first cover 16 can include various retention geometries that can include, but are not limited to, hooks, hasps, clasps, magnets, hook-and-loop and other similar retention features. It is also contemplated that because the first cover 16 is biased toward the seatback 22, the bumper receptacle 66 defined within the seatback 22 can simply be a channel or recess that receives the bumper 26 comprising at least a portion of the front edge 184 of the first cover 16. In this manner, the biasing force exerted by the biasing ribs 28 upon the first cover 16 substantially retains and holds the bumper 26 of the first cover 16 within the bumper receptacle 66. It is further contemplated that in embodiments where the bumper 26 of the first cover 16 includes a retaining feature 190, the retaining feature 190 can also be adapted to engage a portion of the housing 20 proximate the front aperture 140 such that the first cover 16 can be retained in a storage position when the first cover 16 of the tonneau cover 10 is not in use, or when the entire tonneau cover 10 is not in use and/or removed from the vehicle 14 altogether. In this embodiment, the retaining feature 190 defined within the bumper 26 of the first cover 16 is adapted to cooperatively engage the storage feature 192, shaped geometrically similar to the bumper receptacle 66, that can hold the retaining feature 190 of the bumper 26 in a substantially fixed position to retain the first cover 16 in the retracted position 32.

Referring again to the embodiment depicted in FIGS. 7-9, as the first cover 16 is biased toward the seatback 22 and placed in an abutting engagement with the seatback 22, the seatback 22 is configured to receive the bumper 26 of the first cover 16 within the bumper receptacle 66. In this manner, the seatback 22 exerts an opposing biasing force 200 against the bumper 26 of the first cover 16 to further affix the bumper 26 of the first cover 16 within the bumper receptacle 66. Accordingly, as the seat 60 is moved between the plurality of forward and rearward positions 62, 64 and the plurality of upright and reclined positions, the outwardly biased first cover 16 is continuously biased toward the seatback 22 such that the bumper 26 of the first cover 16 is biased into the bumper receptacle 66 and retained therein to substantially avoid inadvertent release of the first cover 16 from within the bumper receptacle 66.

Figure 12:
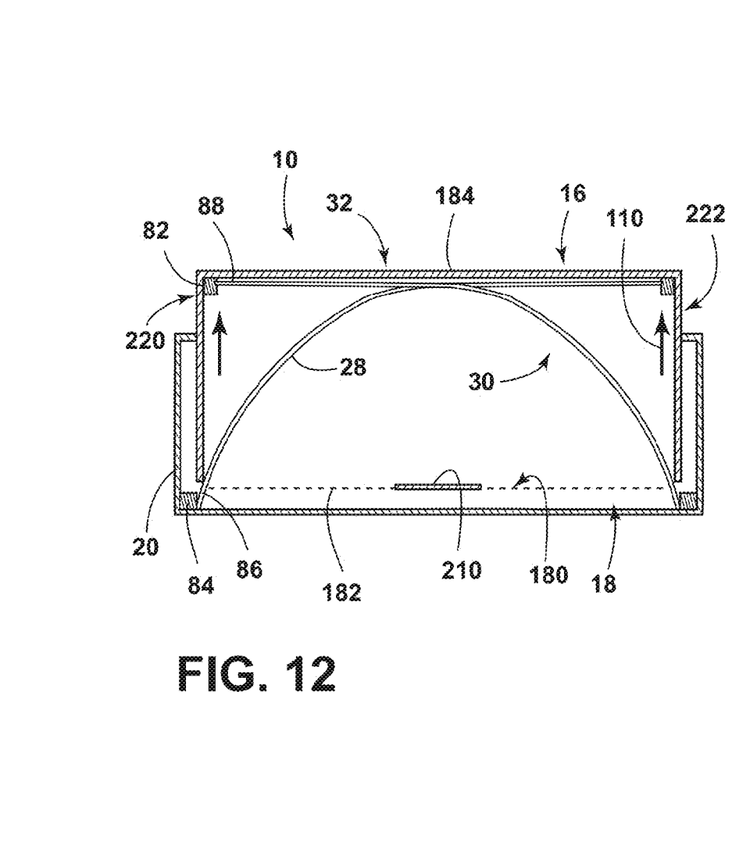
FIG. 12 is a schematic lateral section view of an alternate embodiment of the tonneau cover housing and a planar front cover with the planar front cover in a retracted position.
Figure 13:
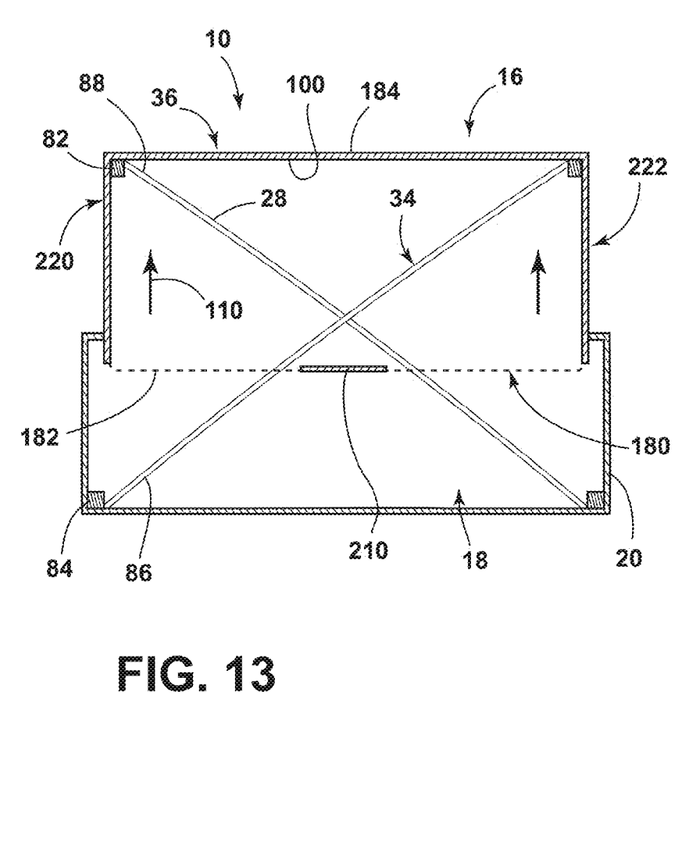
FIG. 13 is a lateral cross-sectional view of the tonneau cover housing of FIG. 12, with the planar front cover outwardly biased to an extended position.

Referring now to the embodiment illustrated in FIGS. 12-13, in embodiments where the first cover 16 of the tonneau cover 10 is operated by a plurality of biasing ribs 28, the biasing ribs 28 can be disposed in a crisscross-type configuration such that the outward biasing force 110 exerted by the biasing ribs 28 tends to evenly move the first cover 16 from the retracted to the extended position 36. The crisscross-type configuration also allows ample space for the biasing ribs 28 to be coiled or otherwise deflected into the respective loaded positions 30 of the biasing ribs 28. As such, the inner portion 80 of the first cover 16 includes a substantially open space to allow for each of the biasing ribs 28 to move between the loaded and release positions 30, 34 as the first cover 16 moves in an outwardly biased manner between the retracted and extended positions 32, 36. In order to support the interior volume of the first cover 16, various internal supports 210 can be defined between the upper and lower panels 212, 214 (shown in FIGS. 7-9) of the first cover 16 to assist in preventing the upper and lower panels 212, 214 from moving toward one another in the manner that might inhibit or otherwise prevent the movement of the biasing ribs 28 between the loaded and release positions 30, 34. It is contemplated that such interior supports are located in such a manner as to avoid the movement patterns of the biasing ribs 28 thereby allowing the biasing ribs 28 ample room to move within the inner portion 80 of the front cover.

Figure 14:
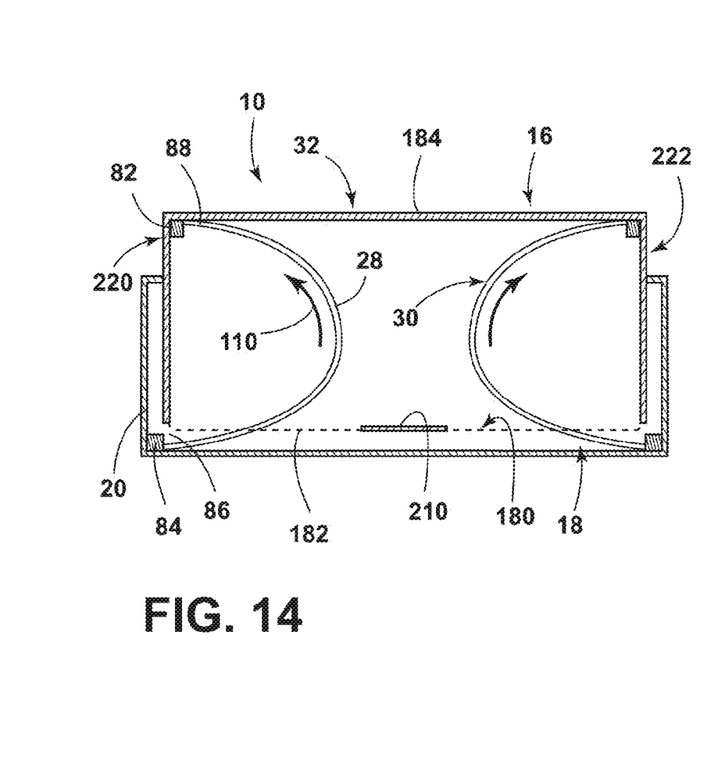
FIG. 14 is a schematic diagram of an alternate embodiment of the biasing ribs of the planar front cover, with the planar front cover in a retracted position.
Figure 15:
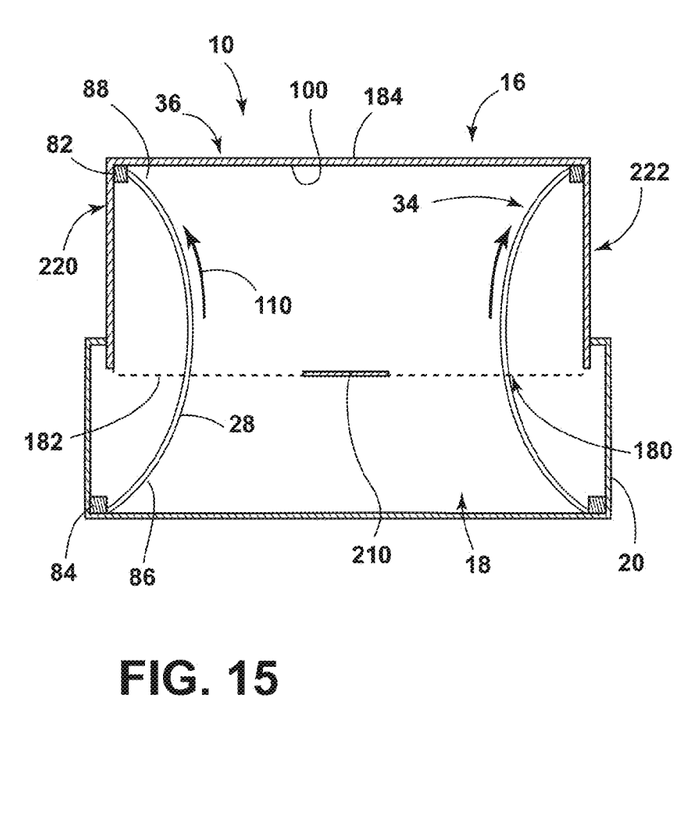
FIG. 15 is a schematic plan view of the tonneau cover of FIG. 14 with the planar front cover in the extended position.

Referring now to the embodiment illustrated in FIGS. 14-15, it is contemplated that the biasing ribs 28 can also be configured to be installed in an edge-type configuration wherein each of the biasing ribs 28 is disposed on opposing sidewalls 82 of the first cover 16. In such a configuration, the loaded position 30 of each of the biasing ribs 28, when the first cover 16 is in a retracted position 32, can substantially take the form of a semi-circular shape, wherein the biasing ribs 28 are deflected along corresponding right and left sides 222, 220 of the first cover 16. As the first cover 16 is moved toward the extended position 36, each of the biasing ribs 28 extends toward the elongated release position 34, thereby extending each of the biasing ribs 28 along corresponding left and right sides 220, 222 of the first cover 16 to bias the first cover 16 outward and into the extended position 36.

Figure 16:
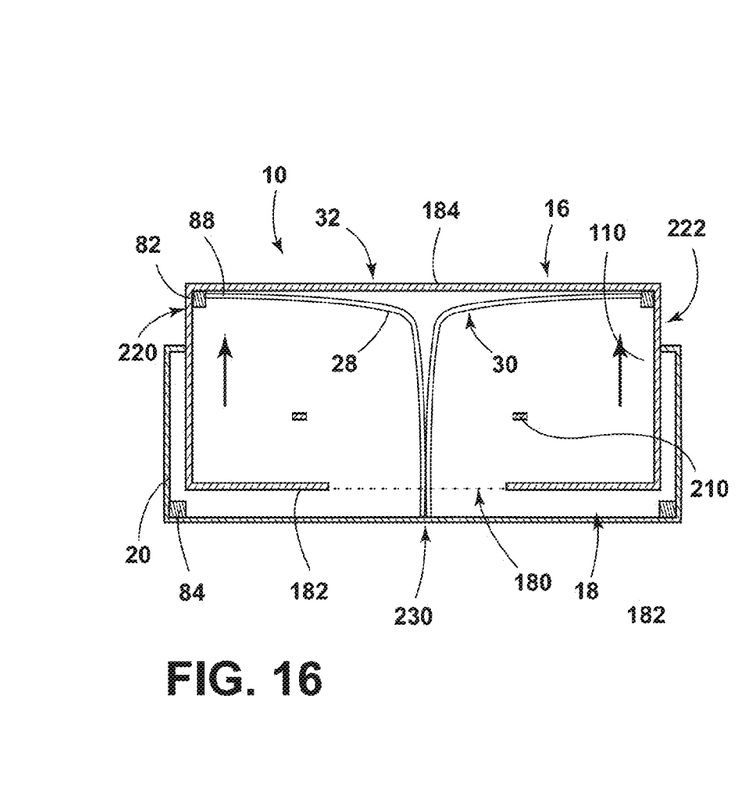
FIG. 16 is a schematic planar view of another alternate embodiment of the biasing ribs of the planar front cover, with the planar front cover in the retracted position.
Figure 17:
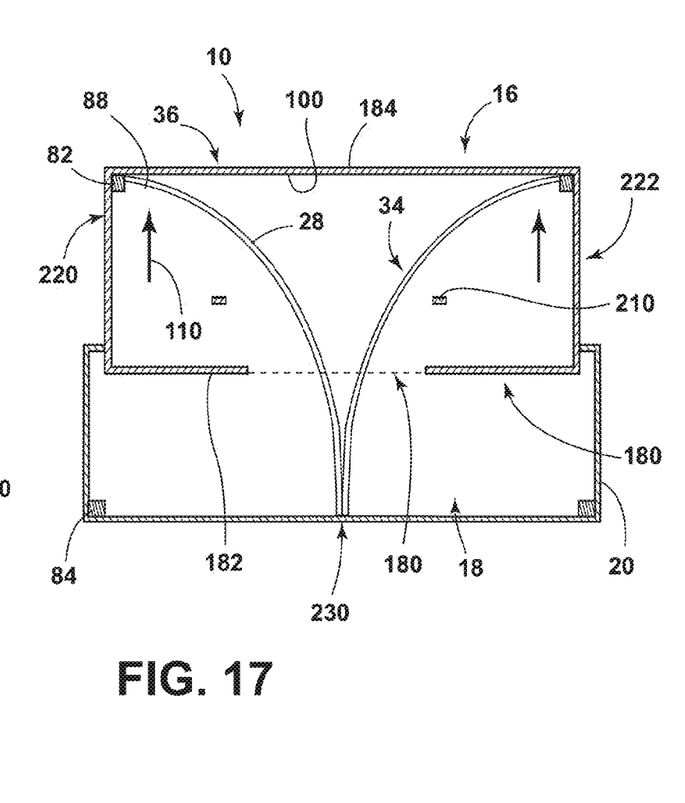
FIG. 17 is a schematic plan view of the tonneau cover of FIG. 16 with the planar front cover in an extended position.

Referring now to the embodiment illustrated in FIGS. 16-17, another alternate configuration of the biasing ribs 28 includes biasing ribs 28 that meet at an intermediate portion 230 of the housing 20 and extend outwardly toward a portion of the first cover 16. Similar to the previous configurations, ample room is provided within the inner portion 80 of the first cover 16 to allow the movement of the biasing ribs 28 to move between the loaded and release positions 30, 34. It is contemplated that various other configurations of the biasing ribs 28 can also be used so long as the biasing ribs 28 are allowed room within the inner portion 80 volume of the first cover 16 to deflect into the loaded position 30 and also move toward a more linear release position 34, thereby utilizing the biasing force of the tendency of each of the biasing ribs 28 to move toward the release position 34 to extend the first cover 16 into the extended position 36.

According to the various embodiments, each of the biasing ribs 28 can be one or more flexible strips that can be made of any one of various materials that can include, but are not limited to, metal, plastic, composite, polymer, combinations thereof, and other similar materials that can be manufactured to tend toward a predetermined configuration. It is contemplated that such predetermined configuration can be, as discussed above, a substantially linear configuration, wherein when the biasing rib 28 is deflected into a curved or coiled shape, the biasing rib 28 exerts a biasing force upon the first cover 16 as the biasing rib 28 tends to move toward the elongated release position 34.

Figure 18:
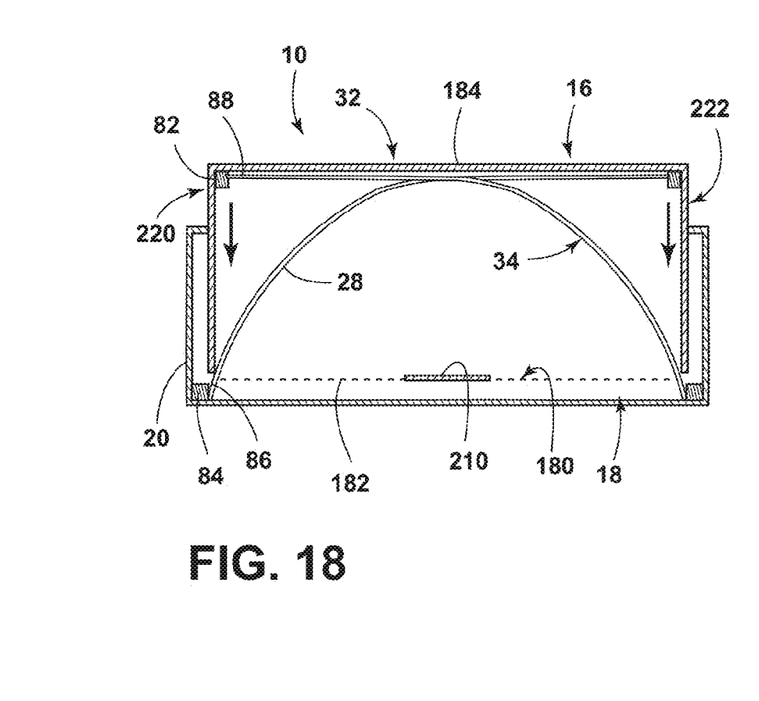
FIG. 18 is a schematic plan view of another alternate embodiment illustrating inwardly biased biasing ribs of the planar front cover, with the planar front cover in the retracted position.
Figure 19:
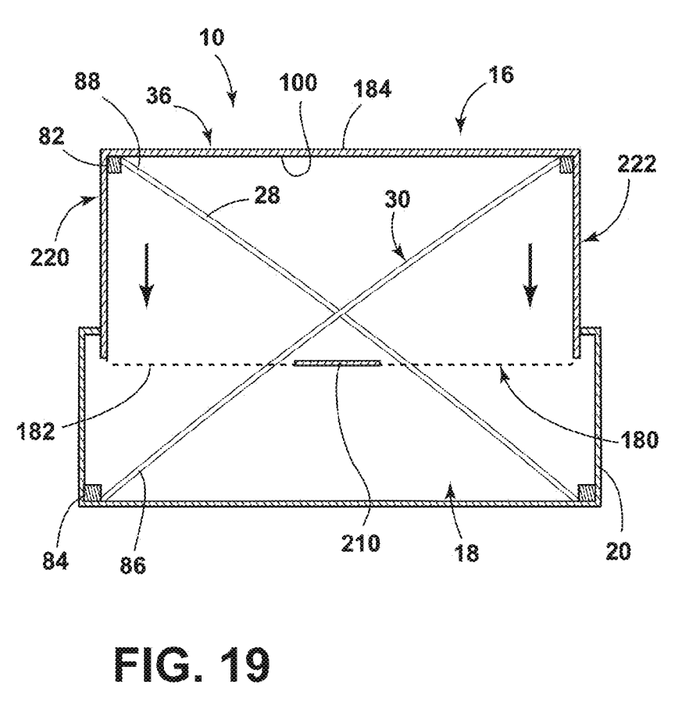
FIG. 19 is a schematic plan view of the tonneau cover of FIG. 18 with the planar front cover in the extended position.

Referring now to the embodiment of FIGS. 18-19, it is also contemplated that the predetermined configuration of the biasing ribs 28 can be a curved shape, spring, coil, or other similarly curved member. In such an embodiment, the tendency of the biasing rib 28 is to move toward a coiled position 124. Accordingly, in this embodiment, the loaded position 30 of the biasing ribs 28 is the elongated configuration and the release position 34 is the coiled configuration. This coiled tendency can be used to bias the first cover 16 from an extended position 36 toward the retracted position 32. In such an embodiment, the first cover 16 defines an inwardly biased planar member that is biased toward the interior 18 of the housing 20 through the front aperture 140 defined within the housing 20. In this embodiment, the hooking configuration of the retaining features 190 of the bumper 26 of the first cover 16 can be configured to matingly cooperate with the respective bumper receptacles 66 defined within the rear seat 60. Because, in this embodiment, the first cover 16 is biased inwardly, the retaining feature 190 of the bumper 26 of the first cover 16 is adapted to be retained by the bumper receptacle 66 in the extended position 36 in order to conceal the front portion 68 of the rear cabin area of the vehicle 14.

According to the various embodiments, the rear second cover 24 of the tonneau cover 10 can be made of a substantially flexible material that is capable of being extended and retracted from within the housing 20 of the tonneau cover 10. Such materials can include, but are not limited to, leather, fabrics, elastic materials, plastic-type fabrics, cloth, as well as other similar type materials. It is contemplated that the material of the second cover 24 will be of a thickness sufficient such that the material can be wound or otherwise disposed within the housing 20, while also minimizing the size of the housing 20 to accommodate the first and second covers 16, 24 being disposed therein. It is also contemplated that the housing 20 can be made of a substantially rigid material that can include, but is not limited to, metal, plastic, polymer, composite, combinations thereof, and other similar substantially rigid materials.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A tonneau cover for a vehicle comprising:
an outwardly-biased first cover biased from an interior of a housing through a front aperture to engage a seatback;
an inwardly-biased second cover selectively extendable through a rear aperture from the interior of the housing opposite the first cover toward a rear door; and
a bumper of the first cover that selectively engages the seatback as the seatback is moved between a plurality of lateral positions.

2. The tonneau cover of claim 1, wherein the first cover includes at least one biasing rib that moves between a loaded position, wherein the first cover is disposed within the interior of the housing, and a release position, wherein the first cover is moved outward from the housing toward the seatback.

3. The tonneau cover of claim 1, wherein the first cover is a substantially planar member that extends and retracts in a substantially linear motion relative to the housing.

4. The tonneau cover of claim 2, wherein one of the at least one biasing rib is attached to a receiving portion of the housing at a first end, wherein a second end of the at least one biasing rib is attached to the first cover, wherein the at least one biasing rib moves to the loaded position as the first cover moves toward the receiving portion of the housing.

5. The tonneau cover of claim 2, wherein the at least one biasing rib includes a plurality of biasing ribs that extend from a front section of the first cover to a receiving portion of the housing, wherein the housing includes a rear spool coupled to the second cover that is configured to rotate within the housing to selectively extend and retract the second cover.

6. The tonneau cover of claim 2, wherein the first cover includes an expandable interior structure that includes the at least one biasing rib, wherein the first cover includes a flexible outer covering that extends and contracts with lateral movement of the first cover.

7. The tonneau cover of claim 5, wherein the first cover in a retracted position extends at least partially under the rear spool.

8. The tonneau cover of claim 1, wherein the housing is selectively engaged with a housing receptacle defined by interior side panels of a vehicle.

9. The tonneau cover of claim 2, wherein the seatback extends across two or more individually operable seats, and wherein the first cover includes a plurality of cover subsections that each correspond to one of the respective two or more individually operable seats.

10. A tonneau cover for a vehicle comprising:
   a front cover within an interior of a housing and selectively operable through a front aperture of the housing between retracted and extended positions;
   a seat having a seatback that receives the front cover in the extended position;
   a biasing rib of the front cover that biases the front cover toward the extended position; and
   a rear cover selectively extendable through a rear aperture of the housing.

11. The tonneau cover of claim 10, wherein the front cover is a planar member that extends through the front aperture of the housing as the front cover operates between the extended and retracted positions, wherein the biasing rib extends from a portion of the front cover to a receiving portion of the housing, and wherein the biasing rib defines a loaded position when the front cover is in the retracted position and further defines a release position when the front cover is in the extended position.

12. The tonneau cover of claim 10, wherein the biasing rib includes a plurality of flexible strips that extend from a front edge of the front cover to a receiving portion of the housing, wherein the housing includes a rear spool coupled to the second cover that is configured to rotate within the housing to selectively extend and retract the second cover.

13. The tonneau cover of claim 10, wherein the front cover is a rigid panel having a plurality of sidewalls that define an inner portion, and wherein the biasing rib is at least partially disposed within the inner portion.

14. The tonneau cover of claim 10, wherein the front cover includes at least one bumper that is adapted to engage the seatback, wherein the at least one bumper engages a bumper receptacle defined within the seatback that is configured to selectively retain the at least one bumper as the seat moves laterally between forward and rearward positions and as the seatback moves rotationally between reclined and upright positions.

15. A tonneau cover for a vehicle comprising:
   a cover housing having an outwardly-biased front cover selectively extending from an interior of the cover housing through a front aperture of the cover housing, wherein the outwardly-biased front cover is biased away from the cover housing and toward a seatback;
   a biasing rib disposed within an inside of the front cover, wherein the inside of the front cover is defined by a plurality of substantially rigid panels; and
   a rearward-extendable rear cover selectively extendable from a rear aperture of the cover housing and selectively biased toward the housing.

16. The tonneau cover of claim 15, wherein the rear cover is selectively extendable through the rear aperture opposite the front cover and toward a rear door of the vehicle.

17. The tonneau cover of claim 15, wherein a seat including the seatback is laterally operable between forward and rearward positions and the seatback is operable between reclined and upright positions after the front cover is engaged with the seat, wherein the front cover remains engaged with the rear seat as the seat is moved between the forward and rearward positions and the seatback is moved between the upright and reclined positions.

18. The tonneau cover of claim 17, wherein the seat includes two or more individually operable seats, and wherein the front cover includes a plurality of cover subsections that each correspond to one of the respective two or more individually operable seats.

19. The tonneau cover of claim 10, wherein the biasing rib includes a plurality of flexible strips that extend from a front edge of the front cover to a receiving portion of the housing, wherein the housing includes a rear spool coupled to the rear cover that is configured to rotate within the housing to selectively extend and retract the rear cover.

20. The tonneau cover of claim 10, wherein the front cover includes at least one bumper that is adapted to engage the seatback, wherein the at least one bumper engages a bumper receptacle defined within the seatback that is configured to selectively retain the at least one bumper as the seat moves between forward and rearward positions and the seatback is moved between upright and reclined positions.

* * * * *